United States Patent
Mueller et al.

(10) Patent No.: US 10,801,643 B2
(45) Date of Patent: Oct. 13, 2020

(54) METHOD FOR DIAGNOSING A DIAPHRAGM VALVE, AND DIAGNOSIS SYSTEM FOR A DIAPHRAGM VALVE

(71) Applicant: GEMÜ GEBR. MÜLLER APPARATEBAU GMBH & CO., KOMMANDITGESELLSCHAFT, Ingelfingen (DE)

(72) Inventors: Gert Mueller, Kuenzelsau (DE); Joachim Brien, Boehmenkirch (DE); Werner Floegel, Doerzbach (DE)

(73) Assignee: GEMÜ GEBR. MÜLLER APPARATEBAU GMBH & CO., KOMMANDITGESELLSCHAFT, Ingelfingen (DE)

( * ) Notice: Subject to any disclaimer, the term of this patent is extended or adjusted under 35 U.S.C. 154(b) by 165 days.

(21) Appl. No.: 15/579,458

(22) PCT Filed: May 17, 2016

(86) PCT No.: PCT/EP2016/060961
§ 371 (c)(1),
(2) Date: Dec. 4, 2017

(87) PCT Pub. No.: WO2016/192966
PCT Pub. Date: Dec. 8, 2016

(65) Prior Publication Data
US 2018/0142806 A1    May 24, 2018

(30) Foreign Application Priority Data

Jun. 2, 2015   (DE) .................. 10 2015 210 210

(51) Int. Cl.
*F16K 37/00* (2006.01)
*F16K 7/12* (2006.01)

(52) U.S. Cl.
CPC ............ *F16K 37/0075* (2013.01); *F16K 7/12* (2013.01); *F16K 37/0041* (2013.01)

(58) Field of Classification Search
CPC .................................................. F16K 37/0075
See application file for complete search history.

(56) References Cited

U.S. PATENT DOCUMENTS 5,008,841 A * 4/1991 McElroy ............. F16K 37/0083
                                                                137/553
9,309,992 B2   4/2016 Bush
(Continued)

FOREIGN PATENT DOCUMENTS

CN   101960193    1/2011
CN     2791394    11/2012
(Continued)

OTHER PUBLICATIONS

Chinese Office Action in original language, pp. 1-5, dated Jan. 18, 2019.
(Continued)

*Primary Examiner* — Jennifer E Simmons
(74) *Attorney, Agent, or Firm* — Bond Schoeneck & King, PLLC; George McGuire

(57) ABSTRACT

The invention relates to a method for diagnosing a diaphragm valve having the following steps: a) providing at least one first quantity that characterizes a valve diaphragm, at least one second quantity that characterizes the diaphragm valve, and at least one third quantity that characterizes operation of the diaphragm valve to a determination device; determining a quantity that characterizes a current state of the valve diaphragm, in particular a current wear, from the first, second, and third quantities by means of the determination device by using at least one algorithm.

12 Claims, 3 Drawing Sheets

(56) References Cited

U.S. PATENT DOCUMENTS

| | | |
|---|---|---|
| 2008/0202606 A1 | 8/2008 | O'Hara et al. |
| 2014/0261740 A1 | 9/2014 | Bush |
| 2014/0261791 A1* | 9/2014 | Grabau ............... F16K 37/0075 |
| | | 137/551 |
| 2015/0045970 A1 | 2/2015 | Anderson |
| 2015/0088434 A1 | 3/2015 | Grabau et al. |

FOREIGN PATENT DOCUMENTS

| | | |
|---|---|---|
| CN | 104049628 | 9/2014 |
| DE | 102009023012 A1 | 12/2010 |
| DE | 102013214304 | 1/2015 |
| DE | 102013214304 A1 | 1/2015 |
| EP | 2202496 A2 | 6/2010 |
| EP | 2202496 | 7/2014 |
| WO | 2010136183 A1 | 12/2010 |
| WO | 2012035291 A2 | 3/2012 |

OTHER PUBLICATIONS

International Search Report and Written Opinion Form PCT/ISA/220 and PCT/ISA/237, International Application No. PCT/EP2016/060961, pp. 1-8, International Filing Date May 17, 2016, mailing date of search report dated Sep. 29, 2016.

* cited by examiner

METHOD FOR DIAGNOSING A DIAPHRAGM VALVE, AND DIAGNOSIS SYSTEM FOR A DIAPHRAGM VALVE

CROSS-REFERENCE TO RELATED APPLICATIONS

This application is the United States National Stage entry under 35 U.S.C. 371 of PCT/EP2016/060961, filed May 17, 2016, which claims priority to German application serial number 102015210210.6 filed Jun. 2, 2015, the entire disclosure of each of which is incorporated herein by reference.

BACKGROUND

The invention relates to a method for diagnosing a diaphragm valve.

DE 10 2013 214 304 A1 discloses a diaphragm valve comprising a valve diaphragm, on which a data carrier in the form of an RFID chip is provided. Thus, not only data relating to the materials, the dimensions, the production and similar key variables of the diaphragm, but also data relating to the relevant customers, the delivery, etc. can be stored in the data carrier and/or referenced digitally in the system. All these data can be aligned with the individual diaphragm in each case, and can be stored on the data carrier associated therewith.

SUMMARY OF THE INVENTION

Proceeding herefrom, the object of the present invention is that of providing a method for diagnosing a diaphragm valve which increases operational reliability and reduces operating costs.

This object is achieved by a method and features important to the invention found in the following description and in the accompanying drawings, it being possible for these features to be important to the invention both individually and in many different combinations, without further additional reference being made hereto.

According to the invention, three different quantities are used to determine the current state of the valve diaphragm. The first quantities relate directly to the valve diaphragm itself, i.e. for example the type and material of the valve diaphragm. These first quantities may, for example, be directly stored and/or referenced in a data carrier that is associated with the valve diaphragm, preferably integrated therein, when producing the valve diaphragm.

The second quantities do not characterize the valve diaphragm, but rather the diaphragm valve as a whole and/or the components thereof (apart from the valve diaphragm), i.e. for example the installation situation, the type of drive, and the like. These second quantities can, for example, be stored in a data carrier that is associated with the diaphragm valve, preferably integrated therein, when assembling the diaphragm valve. These second data can, however, also be saved in an external data portal which is remote from the diaphragm valve.

The third quantities characterize the operation of the diaphragm valve, i.e. contain, for example, process and/or environmental quantities that were gathered in the past, during operation of the diaphragm valve. These third quantities can be collected continuously or at specific points in time, and stored temporarily either in a data store associated with the diaphragm valve or in an external data portal remote from the diaphragm valve.

Combining these three quantities makes it possible, using corresponding mathematical algorithms, to very reliably determine a quantity that characterizes the current state of the valve diaphragm. For example, a remaining lifetime of the valve diaphragm can be precisely determined using the algorithms. For example, the expected time at which a diaphragm will rupture, or the current state of wear can be specified using the algorithms. It is thus possible to predict, using the algorithms, a time at which it will be necessary to change the valve diaphragm for example. In the process, the algorithms can take into account correlations that have been determined, for example, from ruptures of valve diaphragms that have actually occurred and from available first, second and third quantities relating thereto, by means of corresponding data analysis.

In a first development of the method according to the invention, the determined quantity characterizes a remaining lifetime of the valve diaphragm or an equivalent quantity, and, if the determined remaining lifetime or the equivalent quantity is less than a limit value, the determination device then triggers an action. This includes, for example, automatically generating and/or transmitting status information and/or a request for a replacement part and/or warning information. This further improves the operational reliability of the diaphragm valve and the facility in which the diaphragm valve is installed, and interruptions of operation, which are necessary for maintenance and/or repair of the diaphragm valve, are optionally reduced to a minimum, both in terms of number and in terms of duration. The status information may, for example, comprise a likely remaining lifetime of the diaphragm valve or of the valve diaphragm, and/or the warning information may indicate an imminent valve failure.

It is further proposed for a first quantity to be provided by visual surface inspection in step a). For this purpose, an operator can generate images, for example by means of a smartphone or another imaging device. These images can be processed using image processing programs, so that, using image analysis algorithms, a statement can be made regarding the state of the valve diaphragm. This can be achieved simply on the basis of specified features and threshold values, but it is also possible to use more complex methods such as classifying the diaphragm state on the basis of an existing database. A further quantity provided by visual surface inspection is a haptic quantity, for example a roughness of a surface of the valve diaphragm, which can additionally be transmitted.

It is particularly advantageous for the parameters of the algorithms to be changed, in particular optimized, taking into account a first quantity provided by visual surface inspection and/or another analysis of the valve diaphragm, and/or a quantity that characterizes the actual current state of the valve diaphragm. This is particularly expedient if the visual surface inspection and/or the other analysis is carried out after the valve diaphragm has been removed and/or replaced. The algorithms can be continually optimized in this way, and the determination result thus improved.

The degree of automation of the method according to the invention is increased if, in step a), at least one quantity is provided by at least one sensor integrated in the diaphragm valve. Sensors of this kind can measure a third quantity for example, such as an operating temperature or an operating pressure, and can optionally also detect a first quantity for example, such as cracks in the valve diaphragm, or measure a leak.

It is also possible for at least one quantity to be provided, in step a), by an external device, in particular a controller of a facility in which the diaphragm valve is installed, and/or by an external data portal. This can be achieved easily, and the data security is improved when an external data portal or another external device is used.

At least one of the quantities provided in step a) can be a quantity from the following group: a quantity that characterizes swelling and/or sinking of the valve diaphragm; a quantity that characterizes a surface quality of the valve diaphragm; a quantity that characterizes cracks in the valve diaphragm; a quantity that characterizes an energy consumption of the diaphragm valve; a quantity that characterizes a leak of the diaphragm valve; a temperature of the fluid flowing through the diaphragm valve; a pressure of the fluid flowing through the diaphragm valve; a type of the fluid flowing through the diaphragm valve; a pH of the fluid flowing through the diaphragm valve; a curve of the temperature and/or the pressure of the fluid flowing through the diaphragm valve; a number of switching changes; a frequency of the switching changes; a frequency spectrum of the switching changes; operating hours of the valve diaphragm and/or of the diaphragm valve; an age of the valve diaphragm and/or of the diaphragm valve; a material of the valve diaphragm and/or of the valve body; a type of a seat geometry; a type of the valve diaphragm; a type of the valve drive; a production date of the valve diaphragm; a production location of the valve diaphragm; a production batch of the valve diaphragm; quality test statistics of the valve diaphragm and/or of the diaphragm valve; a supplier of the valve diaphragm; a supply channel of the valve diaphragm; a storage location of the valve diaphragm and/or of the diaphragm valve; a storage duration of the valve diaphragm and/or of the diaphragm valve; a date at which the valve diaphragm and/or the diaphragm valve was put into storage; a date at which the valve diaphragm and/or the diaphragm valve was taken out of storage; an installation date of the valve diaphragm and/or of the diaphragm valve; an installation location of the valve diaphragm and/or of the diaphragm valve; a name of the fitter; a name of the operator.

The method according to the invention can be carried out continuously at least at times during operation of the diaphragm valve. This increases the operational reliability, since the current state of the valve diaphragm can be estimated at any time.

Alternatively, however, the method according to the invention can also be carried out at least at times only on demand. This saves on computing capacity. A demand of this kind can be made at regular times for example. It is also possible for said method to be carried out when quantities and/or data that are stored in a data store in the valve diaphragm and/or in the diaphragm valve are read out by a read-out device. The data read out can then be transmitted for example wirelessly to an external data portal on which quantities and/or data relating to the diaphragm valve are also stored, synchronized there with said quantities and/or data as required, and then processed there by means of a corresponding determination device by using the algorithms, in order to thus estimate the current state of the valve diaphragm.

Carrying out step b) in an external processing portal is advantageous in that the operator of the diaphragm valve does not need to have available any corresponding computing capacity.

In the following, an embodiment of the present invention will be described by way of example and with reference to the accompanying drawings, in which.

Figure 1:
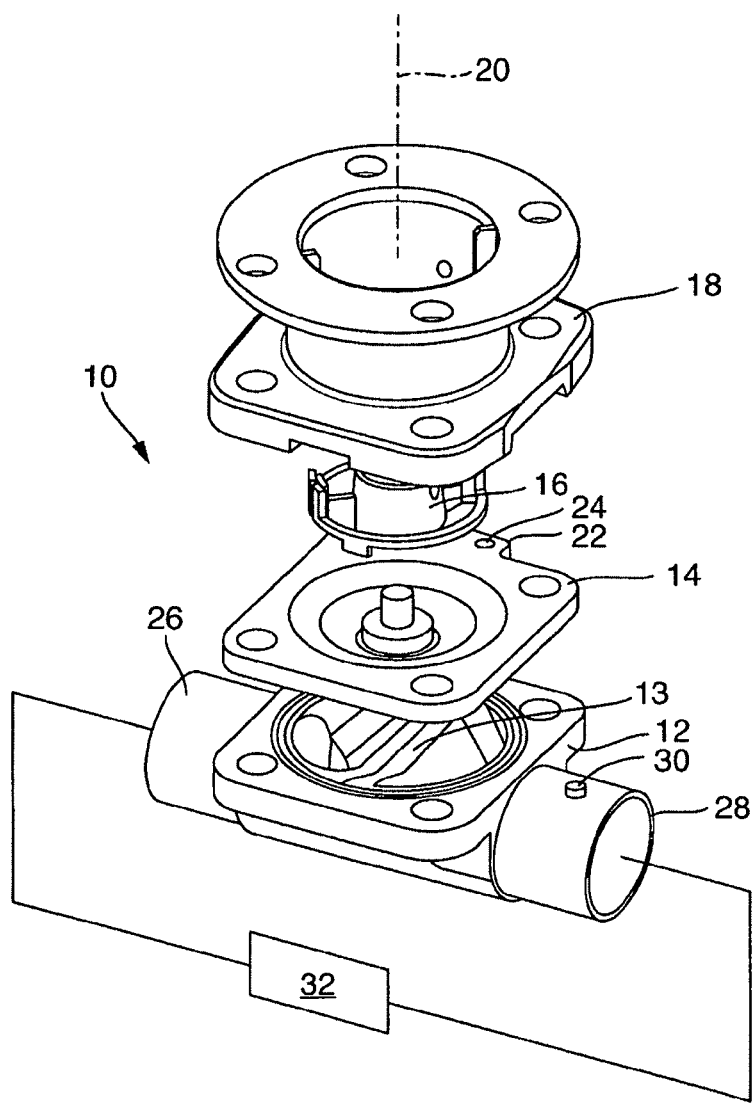
FIG. 1 is a perspective exploded view of a diaphragm valve comprising a valve diaphragm.

In FIG. 1, a diaphragm valve is denoted overall by reference sign 10. Said valve comprises a valve body 12 having a seat geometry 13, a valve diaphragm 14, a thrust piece 16 and an intermediate piece 18. The valve diaphragm 14 is clamped between the valve body 12 and the intermediate piece 18. The thrust piece 16 connects the valve diaphragm 14 to a valve drive 20 which is indicated in FIG. 1 merely by a dot-dash line.

A tab 22 is provided on the edge of the valve diaphragm 14 that is at the rear in FIG. 1, in which tab a data store 24 in the form of an RFID chip is integrated. The housing 12 comprises an inlet connecting piece 26 and an outlet connecting piece 28. In the specific embodiment shown here, a data store 30 in the form of an RFID chip is also arranged on the outlet connecting piece 28. It is also possible, however, to arrange said data store on the inlet connecting piece 26 or on another point of the valve body 12.

The diaphragm valve 10 is installed in a technical facility 32 which, in the present case, is indicated merely symbolically by a box denoted 32. A facility in the pharmaceutical industry for producing a drug, for example, is possible as a technical facility.

Figure 2:
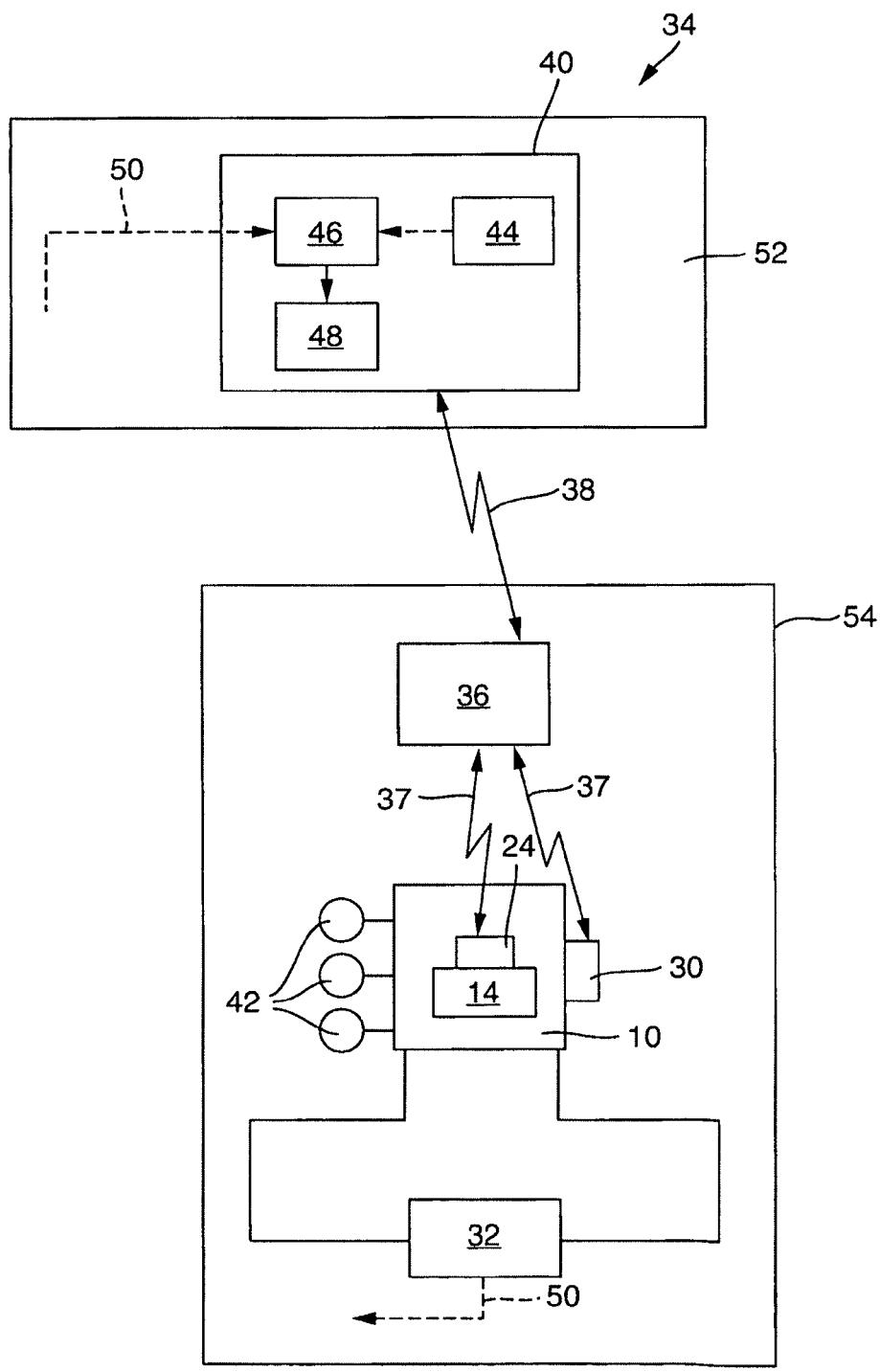
FIG. 2 is a schematic view of a system that comprises the diaphragm valve from FIG. 1.

In FIG. 2, a system that inter alia also comprises the diaphragm valve 10 from FIG. 1 is denoted overall by reference sign 34. The system 34 further comprises a data input and read-out device 36 for reading out data stored in the data store 24 and the data store 30, and for inputting further data and quantities, indicated in FIG. 2 by two lightning-like arrows provided with reference sign 37, furthermore a transmission device 38, symbolized here merely by a lightening-like arrow, for transmitting data between the data input and read-out device 36 and an external data and processing portal 40 that is remote from the data input and read-out device 36 and from the diaphragm valve 10 and that is likewise part of the system 34.

The data input and read-out device 36 may be a particular device that is specifically designed for the diaphragm valve 10, or, for example, a conventional smartphone or a tablet PC, on which a specific software, for example an app, is loaded, and that has a corresponding, for example wireless, option for transmitting data in accordance with the arrows 37 and 38. The data store 24, the data store 30, the data input and read-out device 36, the transmission device 38 and the external data and processing portal 40 are set up and programmed for carrying out a method, and this will be explained in detail below.

Data regarding first quantities that characterize the valve diaphragm 14 are stored in the data store 24. These quantities can, for example, already be stored as data in the data store 24 when producing the valve diaphragm 14. These first quantities can include, for example: a material, a type, a production date, a production location, a production batch, quality test statistics measured when producing the valve diaphragm 14, for example dimensional tolerances, roughness depths, etc., a supplier, a supply channel, a storage location, a storage duration, a date of being put into storage, a date of being taken out of storage, an installation date, an installation location, a name of the fitter who installed the valve diaphragm 14 in the diaphragm valve 10, etc.

A quantity that characterizes swelling and/or sinking of the valve diaphragm 14, a quantity that characterize a surface quality of the valve diaphragm 14, and a quantity that characterizes cracks in the valve diaphragm 14 can also be stored as first quantities in the data store 24. In particular the last-mentioned quantities could, however, also be stored at another location. Moreover, this list is given merely by way of example, and is in no way conclusive. One or more of the first quantities listed above can be stored in the data store 24.

Data regarding second quantities which do not relate to the valve diaphragm 14 but instead in particular to the valve body 12, for example a material, a type, a kind of seat geometry, a production date, a production location, a production batch, quality test statistics measured when producing the valve body 12, for example dimensional tolerances, roughness depths, etc., a supplier, a supply channel, a storage location, a storage duration, a date of being put into storage, a date of being taken out of storage, a type of the valve drive 28, etc. are stored in the data store 30 of the housing 12. However, this list, too, is given merely by way of example, and is in no way conclusive. One or more of the second quantities listed above can be stored in the data store 30 of the housing 12.

Each essential component part of the diaphragm valve 10 can per se be equipped with a data store, for example in the form of an RFID chip, on which the data and/or second quantities relating to this specific component are then stored. It is also conceivable, however, for the data store 30 provided on the outlet connecting piece 28 of the housing 12 to store all the data relating to components that are not the valve diaphragm 14.

The diaphragm valve 10 further comprises a plurality of sensors 42, just three of which are shown here by way of example. These sensors 42 measure third quantities that characterize operation of the diaphragm valve 10. These third quantities can include: a quantity that characterizes an energy consumption of the diaphragm valve 10; a quantity that characterizes a leak of the diaphragm valve 10; a temperature of the fluid flowing through the diaphragm valve 10; a pressure of the fluid flowing through the diaphragm valve 10; a type of the fluid flowing through the diaphragm valve 10; a pH of the fluid flowing through the diaphragm valve 10; a curve of the temperature and/or the pressure of the fluid flowing through the diaphragm valve 10; a number of switching changes of the diaphragm valve 10; a frequency of the switching changes; a frequency spectrum of the switching changes; operating hours of the valve diaphragm 14 and/or of the diaphragm valve 10. In order to carry out the method described below, it is sufficient to take into account just one single third quantity, although a plurality of third quantities can also be taken into account.

At least some of the third quantities just listed can, however, also be provided by an external device, here for example by a controller of the technical facility 32 in which the diaphragm valve 10 is installed, and/or by the external data and processing portal 40. The third quantities can be stored temporarily in the data store 24 and/or in the data store 30.

The data and processing portal 40 shown in FIG. 2 comprises a data store 44, in which data in particular relating to second quantities that characterize the diaphragm valve 10 are stored. The data and processing portal 40 further comprises a determination device 46 and an action module 48. The determination device 46 is connected to the action module 48 and to the data store 44. Said determination device further contains first, second and third quantities, specifically from the data input and read-out device 36 using the transmission device 38, and from the technical facility 32. This is symbolized by dashed arrows 50.

In order to diagnose the state of the diaphragm valve 10, in particular the valve diaphragm 14 thereof, the data stored in the data stores 24, 30 and 44, which data relate to the first, second and third quantities, are supplied to the determination device 46 and firstly digitally referenced and/or synchronized thereby. This is understood to mean that the data are combined to form a kind of digital identity of the specific individual diaphragm valve 10 and the valve diaphragm 14 thereof, for example in the sense of: a specific valve diaphragm X having the unique identification K was produced under particular conditions (raw material, batch, etc.), installed in a particular diaphragm valve V, subjected to various physical quantities G (switching cycles, temperature, pressure, etc.) during operation, and (optionally) evaluated by means of visual surface inspection (crack formation R, blistering B, etc.) during maintenance or after being removed. Parameterizable algorithms are stored in the determination device 46. The parameters of the algorithms are based at least initially on generally known material laws that relate to the lifetime of valve diaphragms, and on empirical correlations.

The synchronized first, second and third quantities are then processed in the determination device 46 by using the algorithms, specifically such that a quantity that characterizes the current wear is determined. Said quantity can, for example, be a remaining lifetime of the valve diaphragm 14. It is also possible for a time of a likely diaphragm failure to be predicted.

The remaining lifetime is compared, in the determination device 46, with a limit value. If the determined remaining lifetime of the valve diaphragm 14 is below the limit value, it is assumed that a rupture of the valve diaphragm 14 is imminent. Corresponding status information is then generated in the action module 48, which information warns the operator of the technical facility 32 of the imminent rupture of the valve diaphragm 14. Optionally, a request for a replacement part can, simultaneously, also be generated automatically in the action module 48 and transmitted to a corresponding logistics center. A maintenance request, for example, can also be generated automatically and transmitted to a corresponding maintenance operation.

When the valve diaphragm 14 is replaced, or optionally also even before, an operator can carry out a visual surface inspection of the valve diaphragm 14, as a result of which a corresponding first quantity is determined that relates, for example, to a visual appearance or a feel of the surface of the valve diaphragm 14. The determined first quantity or the determined first quantities is/are then transmitted to the data input and read-out device 36 for example, from where they are either directly transmitted to the data and processing portal 40 by means of the transmission device 38, or from where they are input into the data stores 24 or 30, for temporary storage, in accordance with the arrows 37.

The first quantities determined by the operator during the visual surface inspection and/or analysis can then be used in the determination device 46, for example in order to adjust the parameters of the algorithms, as a result of which continual optimization is achieved. For this purpose, for example the first quantities determined during the visual surface inspection are compared with corresponding first quantities that the determination device 46 has determined using the previous parameters of the algorithms.

It is also possible, however, for the current state of the removed valve diaphragm 14 to be determined, for example by corresponding visual surface inspection, following replacement of a valve diaphragm 14, and for said current determined actual state to be compared with the estimated state determined using the algorithms and taking into account the first, second and third quantities. Any difference identified between the actual state and the estimated state determined by the algorithms can then be used to change the parameters.

In the embodiment described above, the determination device 46 is arranged in the external data and processing portal 40 that is remote both from the diaphragm valve 10 and from the data input and read-out device 36. The data and processing portal 40 can, for example, be in the possession of a producer 52 of the diaphragm valve 10 or of an external service provider specialized in this field, while the diaphragm valve 10 itself is in the possession of the operator 54 of the technical facility 32. It is in principle also possible, however, for the data and processing portal 40 to also be in the possession of the operator 54. It is further conceivable for the determination device 46, the action module 48 and the data store 44 to be integrated in the data input and read-out device 36, i.e. for said device to form, in this respect, a compact and mobile diagnosis system. It is also conceivable, however, for the third quantities to be provided exclusively by the technical facility 32.

Figure 3:
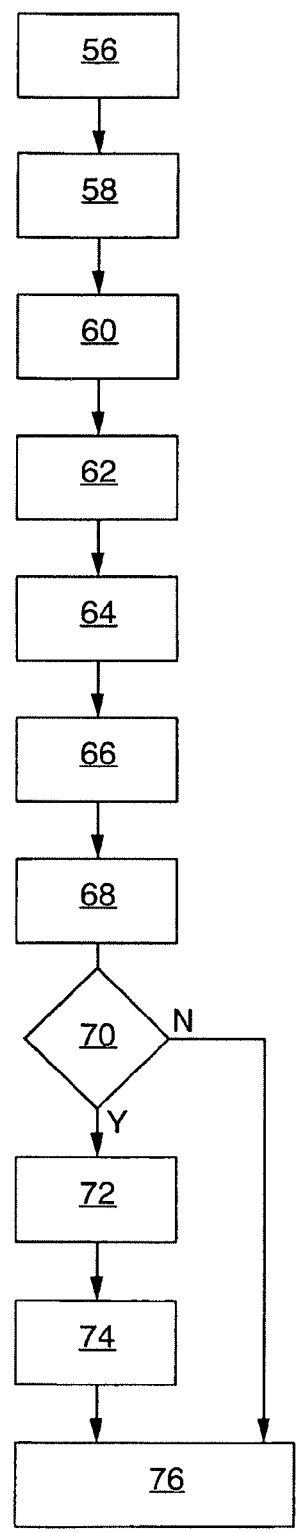
FIG. 3 is a flow diagram of a method for diagnosing the diaphragm valve of FIG. 1.

The methods described above for diagnosing the diaphragm valve 10 can be carried out in the following manner for example (FIG. 3):

Following a starting block 56, the above-mentioned first, second and third quantities are measured in a block 58, and, in block 60, the corresponding data are stored in the data stores 24, 30 and 44. In block 62, the stored data are read out and the corresponding quantities are provided to block 64, in which block a current state of the valve diaphragm 14, in particular a current wear of the valve diaphragm 14, is determined or estimated, on the basis of the quantities or data provided, by using algorithms.

In block 66, the determined current wear of the valve diaphragm 14 is compared with a limit value and, depending on the result of the comparison, an action, for example replacement of the valve diaphragm 14, is prompted in block 68. A query is raised in block 70 as to whether the valve diaphragm 14 has been replaced. If the result is "yes", the actual state of wear of the removed valve diaphragm 14 is compared, in block 72, with the "theoretical" state of wear, i.e. the estimated state of wear determined using algorithms in block 64. Depending on the result of the comparison in block 72, the parameters of the algorithms are adjusted in block 74, i.e. the algorithms are optimized. The method ends in block 76.

What is claimed is:

1. Method for diagnosing a diaphragm valve having a valve diaphragm forming a valve element, the method comprising the following steps:
   a) providing a first, a second, and third quantity to a determination device, the first quantity characterizing directly the valve diaphragm itself, the second quantity characterizing the diaphragm valve as a whole or at least one of the components thereof that are not the valve diaphragm, these second quantities being stored in a data carrier that is associated with the diaphragm valve when assembling the diaphragm valve or being saved in an external data portal which is remote from the diaphragm valve and the third quantity containing a process and/or environmental quantity that was gathered in the past during operation of the diaphragm valve and stored temporarily either in the data carrier associated with the diaphragm valve or in the external data portal remote from the diaphragm valve;
   b) processing the first, second, and third quantities in the determination device and determining a quantity that characterizes a current wear or a remaining lifetime of the valve diaphragm, or an expected time at which the valve diaphragm will rupture from the first, second and third quantities by means of the determination device by using at least one algorithm.

2. Method according to claim 1, characterized in that the determined quantity characterizes at least one of a remaining lifetime of the valve diaphragm and an equivalent quantity, and in that, if the determined remaining lifetime or the equivalent quantity is less than a limit value, the determination device then triggers an action.

3. Method according to claim 1, characterized in that a first quantity is provided by visual surface inspection in step a).

4. Method according to claim 1, characterized in that the at least one algorithm is changed, taking into account at least one of a first quantity provided by visual surface inspection and another analysis of the valve diaphragm, and a quantity that characterizes the actual current state of the valve diaphragm.

5. Method according to claim 1, characterized in that, in step a), at least one quantity is provided by at least one sensor integrated in the diaphragm valve.

6. Method according to claim 1, characterized in that at least one quantity is provided, in step a), by an external device, in particular by at least one of a controller of a facility in which the diaphragm valve is installed, and by an external data portal.

7. Method according to claim 1, characterized in that the first quantity, the second quantity and/or third quantity provided in step a) is a quantity from the following group: a quantity that characterizes swelling and/or sinking of the valve diaphragm; a quantity that characterizes a surface quality of the valve diaphragm; a quantity that characterizes cracks in the valve diaphragm; a quantity that characterizes an energy consumption of the diaphragm valve; a quantity that characterizes a leak of the diaphragm valve; a temperature of the fluid flowing through the diaphragm valve; a pressure of the fluid flowing through the diaphragm valve; a type of the fluid flowing through the diaphragm valve; a pH of the fluid flowing through the diaphragm valve; a curve of the temperature and the pressure of the fluid flowing through the diaphragm valve; a number of switching changes of the diaphragm valve; a frequency of the switching changes of the diaphragm valve; a frequency spectrum of the switching changes of the diaphragm valve; operating hours of the valve diaphragm and of the diaphragm valve; an age of the valve diaphragm and of the diaphragm valve; a material of the valve diaphragm and of a valve body; a type of a seat geometry; a type of the valve diaphragm; a type of a valve drive; a production date of the valve diaphragm; a production location of the valve diaphragm; a production batch of the valve diaphragm; quality test statistics of the valve diaphragm and/or of the diaphragm valve; a supplier of the valve diaphragm; a supply channel of the valve diaphragm; a storage location of the valve diaphragm and of the diaphragm valve; a storage duration of the valve diaphragm and of the diaphragm valve; a date at which the valve diaphragm and the diaphragm valve was put into storage; a date at which the valve diaphragm and/or the diaphragm valve was taken out of storage; an installation date of the valve diaphragm and of the diaphragm valve; an installation location of the valve diaphragm and of the diaphragm valve; a name of the fitter; a name of the operator of the diaphragm valve.

8. Method according to claim 1, characterized in that steps a and b are carried out continuously at least at times during operation of the diaphragm valve.

9. Method according to claim 1, characterized in that steps a and b are carried out at least at times only on demand.

10. Method according to claim 1, characterized in that step b) is carried out in an external processing portal.

11. Method according to claim 1, characterized in that the first and second quantities are stored in an external data portal remote from the diaphragm valve, and the third quantities are stored in a data store integrated in the diaphragm valve and are read out, for provision, prior to step b), and in that the first, second and third quantities are synchronized with one another prior to step b).

12. Diagnosis system for a diaphragm valve comprising: a device for receiving at least one first quantity that characterizes a valve diaphragm, at least one second quantity that characterizes at least one of the diaphragm valve and at least one of the components thereof that are not the valve diaphragm, and at least one third quantity that characterizes operation of the diaphragm valve; and a determination device that determines a quantity that characterizes a current wear or a remaining lifetime of the valve diaphragm, or an expected time at which the valve diaphragm will rupture from the first, second and third quantities by means of the determination device by using at least one algorithm, wherein the second quantity is stored in one of a data carrier that is associated with the diaphragm valve when assembling the diaphragm valve, or saved in an external data portal which is remote from the diaphragm valve, and wherein the third quantity contains a process and/or environmental quantity that was gathered in the past during operation of the diaphragm valve and stored temporarily either in the data carrier associated with the diaphragm valve or in the external data portal remote from the diaphragm valve.

* * * * *